Patented July 20, 1948

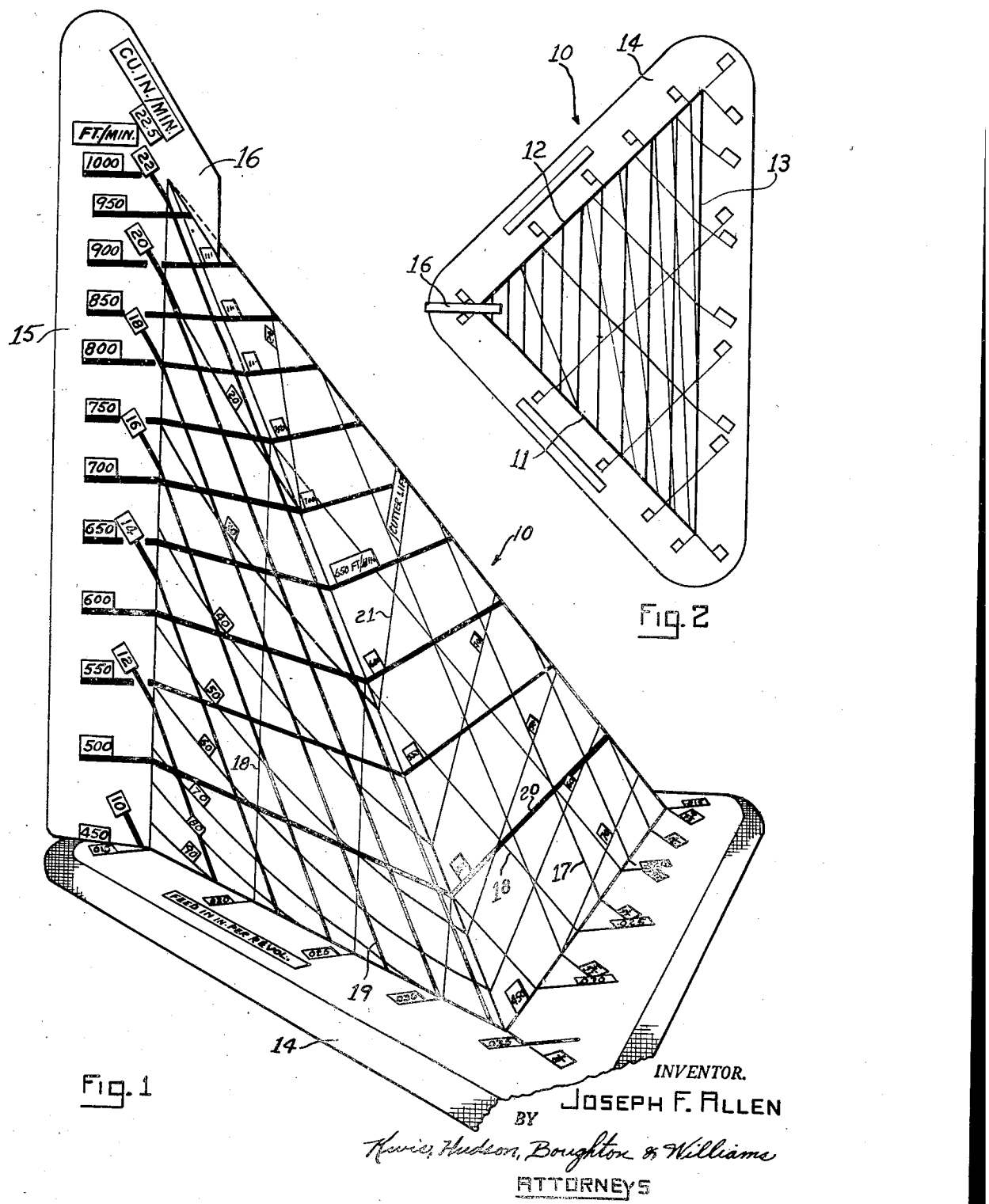

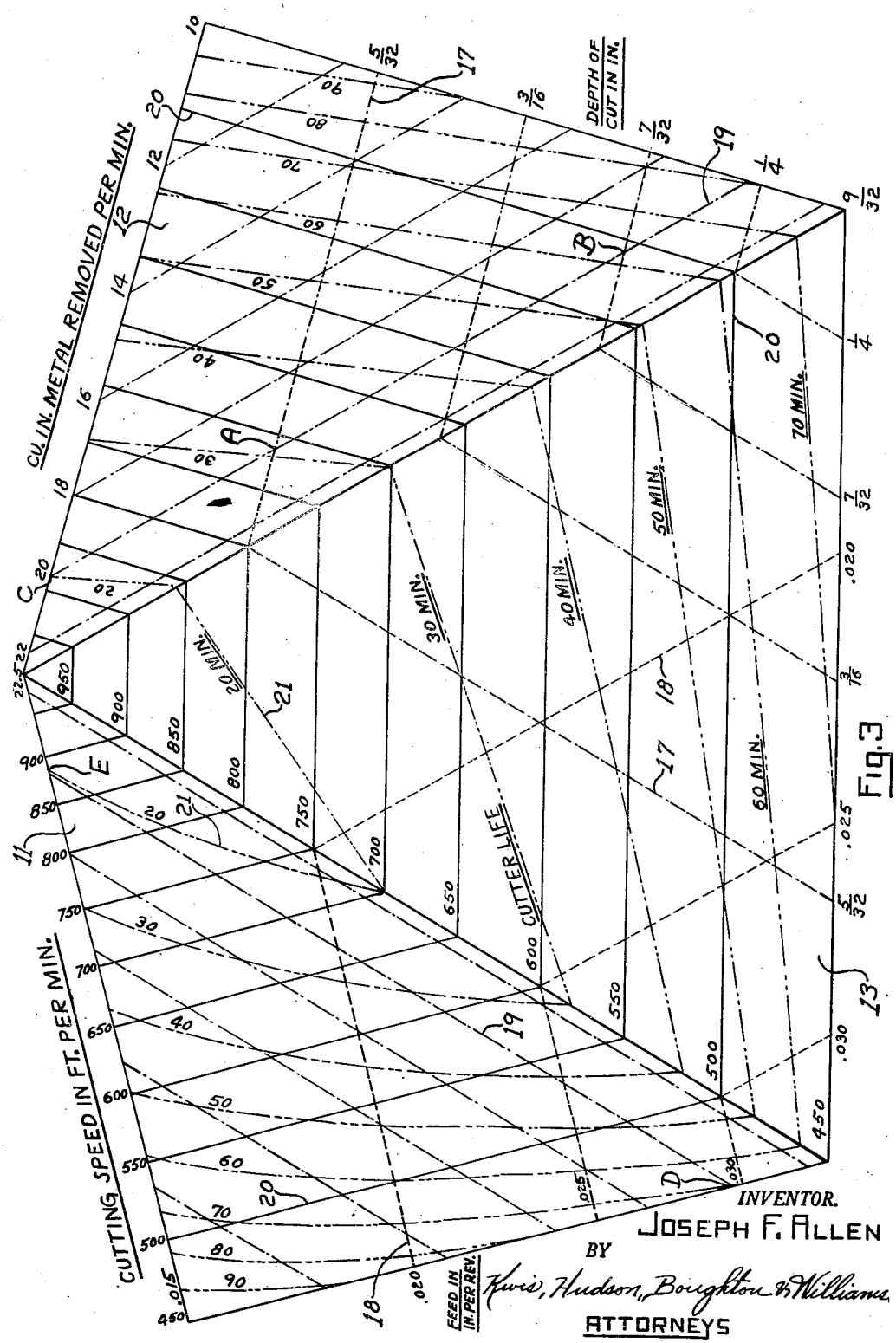

2,445,381

UNITED STATES PATENT OFFICE 2,445,381

CUTTER LIFE CALCULATOR

Joseph F. Allen, Cleveland Heights, Ohio, assignor to The Warner & Swasey Company, Cleveland, Ohio, a corporation of Ohio Application September 19, 1947, Serial No. 775,057

7 Claims. (Cl. 235—85)

This invention relates to a calculator and more particularly to a device for determining the life of cutter tools for given operating conditions and/or the optimum operating conditions to provide the longest possible life for such tools when performing a given machining operation.

An object of this invention is to provide a novel device for readily visually determining the life of a cutter tool for given operating conditions and/or for determining the optimum operating conditions to provide the longest possible life for such tools.

Another object of the invention is to provide a three dimensional device for visually determining the life of a cutter tool for given operating conditions and/or for determining the optimum operating conditions of such a tool.

A further object of the invention is to provide a novel device in which cutting speeds, rates of feed, depth of cut, and rates of metal removal for cutter tools are so correlated in a simple three dimensional body that the life of such a tool for a given set of operating conditions can readily be determined without the necessity of performing any calculations, and which device also enables the optimum operating standards or conditions for such a tool to be determined.

A still further object of the invention is to provide a novel means for representing machine tool operating conditions or standards which enables the life of the tool for given operating conditions and/or the optimum operating conditions of the cutter to be readily and visually determined without the necessity of performing calculations.

The invention further resides in certain novel features of construction and combinations and arrangements of parts, and further objects and advantages thereof will be apparent to those skilled in the art to which it pertains from the following description of the present preferred embodiment thereof, described with reference to the accompanying drawings in which similar reference characters represent corresponding parts throughout the several views and in which:

Fig. 1 is a perspective view of the present preferred embodiment of a novel calculating device constructed in accordance with this invention;

Fig. 2 is a plan view, on a reduced scale, of the device illustrated in Fig. 1; and Fig. 3 is a developed elevational view of the upright surfaces of the device illustrated in Figs. 1 and 2, further illustrating the graduations thereon and the mode of use.

As a result of very extensive experimentations with cutter tools, and especially with tungsten carbide cutter tools, it has been found that the life of these tools, that is, the length of time which they may be employed without the necessity of resharpening, bears a definite relationship to the conditions of their use. More specifically, it has been found that for a given rate of material removal the life of such a tool is dependent upon the cutting speed, rate of feed, and depth of cut of the tool. Thus, for a given rate of metal removal by means of a tungsten carbide tool it has been found that longest cutter life will be obtained by employing a low speed, and a rate of feed and depth of cut which will produce a heavy cut. Also, for a given depth of cut, a heavy feed and low speed gives much longer cutter life for a given rate of material removal than does a light feed and a high speed. Finally, for a given feed rate, the use of a heavy depth of cut and low speed gives a much longer cutter life for a given rate of material removal than does a light depth of cut and high speed. In all cases, it appears that high speed is to be avoided whenever possible.

It has further been found that the constant values of these various factors, namely, cutting speed, rate of feed, depth of cut, and rate of metal removal, may each be represented as sets of parallel planes which sets of planes intersect to give the values of the life of the tool corresponding to the various conditions of operation represented by the planes. That is to say, if one set of planes, which is representative of various constant cutting speeds, is arranged to extend in a horizontal direction, then a second set of planes extending in a vertical direction will represent constant rates of feed. A third set of planes also extending in a vertical direction but at right angles to the second set represent constant depths of cut. A fourth set of planes, inclined to the vertical, represent constant rates of material removal and the common intersection of planes from these sets, one plane from each set, is a measure of the life of the cutter for the conditions represented by the intersecting planes.

This discovery is employed, in accordance with this invention, to provide a simple calculator from which the relation of these various factors of cutter operation to cutter life may be readily determined so that the cutter may be employed in its most efficient manner in a given machining operation. Since, as noted above, four sets of intersecting planes are representative of the four factors of cutter operations they are embodied, in accordance with this invention, in a three dimensional body, generally designated 10, having the shape of a tetrahedron, each face of which is bounded by one of the above mentioned four sets of planes. The illustrated embodiment of the invention is designed for use with tungsten carbide tools and hence the tetrahedron has two vertically extending surfaces or faces 11 and 12 which extend perpendicularly and at right angles to each other. A third face or surface 13 of the tetrahedron is inclined to horizontal at an angle of substantially 45 degrees. The surfaces 11 and 12 are congruent, isosceles triangles and the base is likewise an isosceles triangle extending substantially horizontally and hence at right angles to the faces or surfaces 11 or 12. The surface or face 13 is an equilateral triangle which, as mentioned above, makes an angle of 45 degrees with the base. For convenience in using the device, the base of the tetrahedron is mounted upon a platform or base extension 14. The upper surface of which is coextensive with the fourth face or base of the tetrahedron.

The device is also provided with a vertically extending fin or flange 15 extending along the intersection of the surfaces or faces 11 and 12. This flange is conveniently secured to the calculating device by mounting its lower end upon the base extension 14 and by providing a laterally and downwardly extending projection 16 for attachment to the upper portion of the face or surface 13. This flange or fin is provided for the purpose of scribing thereon or otherwise marking certain indicia for use with the calculating device and the outwardly extending upper surfaces of the base member 14 perform a similar function. This facilitates the application of the indicia and prevents obscuring portions of the graduations on the faces of the tetrahedron thereby facilitating the use of the device to a greater extent than if all the indicia were marked or scribed directly upon the faces thereof.

As will be seen in Fig. 1, the device is here illustrated as an opaque solid constructed of any suitable material and having parallel sets of intersecting graduations or lines scribed or otherwise marked thereon. Preferably, the graduations or lines of each parallel set are marked with a color which differs from that employed when marking the lines of any other of the sets of lines or graduations to facilitate their identification. These various lines represent the edges of the several intersecting planes mentioned above and hence, the device should not be visualized simply as a body having lines scribed or marked thereon, but rather should be considered as composed of a plurality of intersecting plane surfaces, the edges only of which are visible.

In the illustrated embodiment, the face 11 of the tetrahedron corresponds to a plane representative of a constant depth of cut, which for convenience has been chosen as ⅛ inch. Hence, the parallel sets of lines, designated 17, extending vertically upward from the base line of the face 12 (see Fig. 3) represent the edges of planes parallel with the face 11 and each corresponding with a given constant depth of cut. These planes, in the present instance, have been assigned values differing from each other by $\frac{1}{32}$ of an inch and include a range extending from ⅛ inch to $\frac{3}{32}$ inch. The edges of these planes 17 are identified in Fig. 3 by lines comprising pairs of dashes separated from succeeding pairs of dashes by a dot and it will be observed that these planes also intersect the face 13 of the tetrahedron.

The face 12 of the tetrahedron corresponds with a plane representative of a constant rate of feed, expressed in inches per revolution of the work upon which the tool operates, the plane of the face being in the present instance represented as having a value of .015 inch per revolution. Parallel with the face 12 are sets of other planes the edges of which appear in the face 11 of the tetrahedron as vertically extending dash lines designated 18 and being assigned values of .020, .025, .030 and .035 inch per revolution. These planes also intersect the face 13 of the tetrahedron as will be observed from Fig. 3.

The face 13 of the tetrahedron corresponds with a plane representative of rate of material removal expressed in cubic inches per minute, and in this instance the face 13 is assigned a value of 22.5 cubic inches per minute. Extending parallel with the face 13 of the tetrahedron are other planes 19 representing constant rates of material removal the edges of which appear as inclined lines intersecting the faces 11 and 12 and extending parallel with the surface 13, these lines being represented in Fig. 3 as dash-dot lines. In the illustrated embodiment, rates of material removal extending from values of 10 cubic inches per minute to 22.5 cubic inches per minute are indicated.

The base of the tetrahedron corresponds with a plane representative of a constant rate of cutting speed expressed in feet per minute and in this case is assigned a value of 450 feet per minute. Extending parallel with the base are a series of other planes representing other constant cutting speeds and in the present instance cutting speeds at intervals of 50 feet per minute and extending from 450 to 1000 feet per minute are indicated. The edges 20 of these planes appear in each of the faces 11, 12 and 13 of the tetrahedron, being indicated therein as solid lines extending parallel with the boundaries of the base. In addition, the faces 11, 12 and 13 of the tetrahedron are provided with a series of spaced lines 21, which appear in Fig. 3 as pairs of dots separating adjacent dashes. These lines represent surfaces of constant cutter life, expressed in minutes, and are indicative of the expected life of the cutter for various conditions of operation thereof, the life for a particular set of conditions being indicated by the value of that surface 21 in which the planes, parallel with the surfaces 11, 12, 13 and 14 and representing the conditions of use of the cutter, intersect. The illustrated embodiment of the invention is designed to represent cutter lives of 10 to 100 minutes duration.

The novel calculating device of this invention is employed in the following manner. Let it be assumed that 20 cubic inches of material are to be removed a minute, that the depth of the cut is to be $\frac{3}{32}$ of an inch, and that the feed rate is .015 of an inch per revolution. By locating the common intersection of the planes representing these values in the tetrahedron the cutting speed and the life of the cutter can be readily determined. In locating the intersection of these planes it will be remembered that the face 12 of the tetrahedron represents the plane of constant feed having a value of .015 inch per revolution. Hence, referring to Fig. 3, the user of the device locates upon the face 12 of the tetrahedron the edge of that plane 19 which bears the indicium 20 and therefore is indicative of material removal at the rate of 20 cubic inches per minute. Following along the edge of this plane and in the plane of the face 12, the intersection of these two planes with the plane 17 bearing the indicium $\frac{3}{32}$ of an inch, representing the depth of cut, is located at the point marked A. It will be seen that this point lies in a horizontally extending plane lying between those marked 700 and 750 and closer to the former. By measurement this will be found to be a plane representing a cutting speed of 712 feet per minute and, since the point A representing the intersection of these planes lies in the face 12, the cutter life is determined by measuring directly in the plane of that face the distance from the point A to the nearest surface indicative of the cutter life which is represented by a line 21. It is therefore found that the cutter life for operation at the conditions specified will be substantially 31 minutes.

If rate of material removal be held constant at 20 cubic inch per minute and the feed rate be held at .015 inch per revolution but the depth of cut be increased to $\frac{3}{32}$ of an inch, the cutting speed will drop to 510 feet per minute and the cutter life will be increased to 62 minutes. This corresponds to the point marked B upon Fig. 3 which is found in the same manner as was point A. That is to say, since the face 12 represents the plane indicative of a feed rate of .015 inch per revolution, one follows along the edge of the plane 19 representing 20 cubic inches of metal removed per minute and finds the intersection, in the plane of the face 12, of this plane with the plane 17 indicating a depth of cut of $\frac{3}{32}$ inch. This intersection of the plane lies in a horizontally extending plane slightly above the horizontal plane 20 which represents a value of cutting speed of 500 feet per minute, the point B being found, by measurement, to be lying on a plane representing a speed of 510 feet per minute. Likewise, the point B is found to lie between cutter life designations of 60 and 70, minutes being closer to the former, and, by measurement, actually being at a point indicative of a cutter life of 62 minutes duration.

If an attempt were made to remove 20 cubic inches per minute with a depth of cut of ⅛ inch and a feed of .015 inch per revolution, it would be found that a cutting speed of 885 feet per minute would be required and that the cutter life would drop to 20 minutes duration. This corresponds to the point designated C in Fig. 3 and is found in the same manner as points A and B, it being remembered that a cut of ⅛ inch depth corresponds with the plane parallel with the face 11 and hence the common intersection of the planes falls upon the vertical joining edge between the faces 11 and 12 of the tetrahedron for the values expressed.

Assuming that the depth of cut is to be kept constant at ⅛ inch and it is desired to remove 20 cubic inches of material a minute, this may be done by selecting a cutter speed of 450 feet per minute and a feed of approximately .0295 inch per revolution. This would result in a cutter life of 70 minutes duration, as indicated by the point designated D, in Fig. 3. This point is found in the same manner as points A and B with the exception that the intersections of the several planes now falls in plane of the face 11 of the tetrahedron by virtue of the fact that a depth of cut of ⅛ inch was selected which corresponds with the plane of the face 11. If a feed rate of .015 inch per revolution were to be employed with a depth of cut of ⅛ inch and material removal of 20 cubic inches per minute it would be necessary to increase the cutting speed to 890 feet per minute and under these conditions the cutter life would be only 20 minutes. This condition is represented by the point marked E in Fig. 3 and which is found in exactly the same manner as the other points previously described and hence its location will not be described in detail.

For convenience of description, each of the points just located has been so chosen as to fall upon one of the external faces of the calculator. However, by visualizing the planes and surfaces represented by the lines upon the faces of the tetrahedron it should be possible to imagine points within the tetrahedron as well as upon the external surfaces thereof and corresponding to various other values of the operating conditions of the tool. The cutter lines corresponding to such points may be readily determined by projecting them upon the faces of the tetrahedron.

For purposes of example, certain points have been determined by the aid of the novel calculating device based upon the assumption of a desired known rate of metal removal and upon a known fixed depth of cut in inches and rate of feed, the resulting necessary cutting speed and life of the tool being determined therefrom. Also, the use of the device has been illustrated for determining the optimum cutting speed, feed rate, and depth of cut for effecting a given rate of metal removal with a high cutter life. It will be apparent, however, that the device may also be used to determine the life of the cutter and rate of material removal if the cutting speed, rate of feed and depth of cut are known. In other words, the novel calculator enables the determination of the operating conditions of the cutter for any situation within the scope of the values of the calibrations placed thereon.

While the improved calculator has been illustrated as being mounted so that the parallel planes representing cutter speeds are parallel with the base, it will be apparent that any face of the tetrahedron may be chosen as a base, if desired. The calculator may be constructed of any suitable material such as cardboard, wood, metal, plastics or the like, may be either solid or hollow and is preferably opaque. However, in certain instances it may be feasible to construct the tetrahedron of transparent material with or without thin plane surfaces extending therethrough and corresponding with at least some of the sets of intersecting planes to facilitate the use of the device; or the device may be constructed of transparent material with only the edges of the plane indicated on the faces thereof. Furthermore, the device may be constructed of a plurality of interfitting parts so that portions thereof may be removed to reveal the intersections of planes which fall within the interior of the tetrahedron.

Moreover, while the device has been represented as peculiarly adapted for determining the operating conditions of tungsten carbide cutter tools it will be apparent that the same principles may be employed for constructing calculators for tools of other compositions by employing planes extending at suitable angles with respect to each other. These as well as other adaptations and modifications of the device, which will readily suggest themselves to those skilled in the art, are considered as encompassed by this invention. Therefore, the invention is not be considered as limited to the precise details herein illustrated and described but only as required by the spirit and scope of the appended claims.

Having thus described my invention, I claim:

1. A calculator of the character described comprising a multi-face body having plane surfaces which are respectively parallel with planes indicative of various related factors, at least some of the faces of the body being provided with graduations representing the edges of planes parallel with others of the various faces of the body and representing gradations in the related factors, and other graduations upon the body representing the combined effect of the various related factors, the several graduations being so arranged that the common intersection of the planes of a given set of factors represented thereby is correlated to the said other graduations whereby the combined effect of any set of the related factors may be visually determined.

2. A calculator of the character described comprising a multi-face geometrical solid body having plane surfaces which are respectively parallel with planes indicative of various related factors of machine tool operation, at least some of the faces of the body being provided with graduations representing the edges of planes parallel with others of the various faces of the body and representing gradations in the related factors, and other graduations upon the body representing the combined effect of the various related factors, the several graduations being so arranged that the common intersection of the planes of a given set of factors represented thereby is correlated to the said other graduations whereby the combined effect of any set of the related factors may be visually determined.

3. A calculating device for a cutter tool comprising a three dimensional body having plane faces which are parallel with planes respectively representing a constant cutting speed of the tool, a constant rate of feed of the tool, a constant depth of cut of the tool and a constant rate of material removal, and graduations on certain of the faces of the body representing the edges of sets of planes, each of said sets of planes being parallel with one of the faces of the body and the planes of each set representing gradations in the value of the factor represented by that face of the body which is parallel therewith and other graduations upon the body representing the life of the cutter, whereby the length of life of a cutter for given values of cutting speed, rate of feed, depth of cut and rate of material removal is determined by observing the relation of the common intersection of the planes corresponding to the given values of these factors with said other graduations representing cutter life.

4. A calculating device for a cutter tool comprising a tetrahedron the faces of which are parallel with planes respectively representing a constant cutting speed of the tool, a constant rate of feed of the tool, a constant depth of cut of the tool and a constant rate of material removal, and graduations on certain of the faces of the tetrahedron representing the edges or sets of planes, each of said sets of planes being parallel with one of the faces of the tetrahedron and the planes of each set representing gradations in the value of the factor represented by that face of the tetrahedron which is parallel therewith, and other graduations upon the tetrahedron representing the life of the cutter, whereby the length of life of a cutter, for given values of cutting speed, rate of feed, depth of cut, and rate of material removal is determined by observing the relation of the common intersection of the planes corresponding to the given values of these factors with the said other graduations representing cutter life.

5. A calculator for determining the operating conditions for a cutter, said calculator comprising a tetrahedron having a pair of faces extending at right angles to each other and each extending at right angles to a third face, the fourth face of the tetrahedron extending at a predetermined angle with respect to said third face, graduations on at least some of the faces of the tetrahedron representing the edges of sets of planes extending parallel with the faces of the tetrahedron, the said sets of planes representing gradations in related factors of cutter operation, and other graduations on the faces of said tetrahedron indicative of cutter life whereby the life of the cutter for any given set of values of the said related factors is visually determined by observing the relation of the common intersection of the planes corresponding to the given values of these factors with the said graduations indicative of cutter life.

6. A calculator for determining the life of a cutter, said calculator comprising a tetrahedron having a pair of faces extending at right angles to each other and each extending at right angles to a third face, the fourth face of the tetrahedron extending at a predetermined angle with respect to said third face, graduations on at least some of the faces of the tetrahedron representing the edges of sets of planes extending parallel with the faces of the tetrahedron, the planes parallel to the faces extending at right angles to each other representing gradations of constant rates of feed and constant depths of cut respectively, the planes parallel to said third face representing gradations of constant cutting speeds, and the planes parallel to the fourth face representing gradations of constant rates of material removal, and other graduations on the faces of said tetrahedron indicative of cutter life, whereby the life of the cutter for a given rate of feed, rate of material removal, cutting speed, and depth of cut, is visually determined by observing the relation of the common intersection of the planes corresponding to the given values of these factors with the said graduations indicative of cutter life.

7. A calculator for determining the life of a cutter, the said calculator comprising a tetrahedron having a horizontal base, a pair of faces perpendicular to said base and extending at right angles to each other, and a face forming a predetermined angle with said base, graduations on the three faces of the tetrahedron representing the edges of sets of planes extending parallel with the base and the faces of the tetrahedron, the planes parallel to the base representing different values of constant cutting speeds, the planes parallel to the face forming said predetermined angle with the base representing different values of constant rates of metal removal and the planes parallel with each of the other faces representing different values of constant rates of feed and constant depths of cut respectively, and other graduations on said faces indicative of cutter life, whereby the life of the cutter for a given rate of feed, rate of material removal, cutting speed and depth of cut is visually determined by observing the relation of the intersection of the planes corresponding to the given values of these values with the said graduations indicative of cutter life.

JOSEPH F. ALLEN.